(12) United States Patent
Chen

(10) Patent No.: US 11,649,810 B2
(45) Date of Patent: May 16, 2023

(54) OIL SUCTION PUMP

(71) Applicant: ESUN TOOLS MFG. LTD., Taichung (TW)

(72) Inventor: Chin-Chuan Chen, Taichung (TW)

(73) Assignee: ESUN TOOLS MFG. LTD., Taichung (TW)

( * ) Notice: Subject to any disclaimer, the term of this patent is extended or adjusted under 35 U.S.C. 154(b) by 588 days.

(21) Appl. No.: 16/706,774

(22) Filed: Dec. 8, 2019

(65) Prior Publication Data

US 2021/0172349 A1 Jun. 10, 2021

(51) Int. Cl.
| | | |
|---|---|---|
| *F01M 11/04* | (2006.01) | |
| *F04B 23/02* | (2006.01) | |
| *F04B 53/00* | (2006.01) | |
| *F16K 17/04* | (2006.01) | |

(52) U.S. Cl.
CPC ......... *F04B 23/025* (2013.01); *F01M 11/045* (2013.01); *F04B 53/001* (2013.01); *F16K 17/04* (2013.01)

(58) Field of Classification Search
CPC ....... F01M 11/045; F04B 9/14; F04B 23/025; F04B 33/00; F04B 39/0016; F04B 53/001; F04B 53/16; F04F 3/00; F04F 5/14; F04F 5/20; F04F 5/52; F16K 15/063; F16K 15/142; F16K 17/04; F16K 31/22
See application file for complete search history.

(56) References Cited

U.S. PATENT DOCUMENTS

| | | | | |
|---|---|---|---|---|
| 4,606,477 | A * | 8/1986 | Spengler | A47L 11/1625 222/401 |
| 6,558,138 | B2 * | 5/2003 | Tseng | F04B 9/14 417/40 |
| 7,093,624 | B2 * | 8/2006 | Chen | F04B 33/00 141/59 |
| 7,367,366 | B2 * | 5/2008 | Liao | F04F 1/06 417/86 |
| 8,360,741 | B2 * | 1/2013 | Chuang | F04B 9/14 417/374 |
| 9,046,113 | B2 * | 6/2015 | Chuang | F04B 33/00 |
| 9,222,471 | B2 * | 12/2015 | Liao | F04B 39/14 |
| 2007/0048149 | A1 * | 3/2007 | Chang | F04B 33/00 417/374 |
| 2019/0309739 | A1 * | 10/2019 | Liao | F04B 9/14 |
| 2020/0261936 | A1 * | 8/2020 | Chen | F04F 1/06 |

* cited by examiner

*Primary Examiner* — Dominick L Plakkoottam
*Assistant Examiner* — Charles W Nichols

(57) ABSTRACT

An oil suction pump contains: an oil storage cylinder, a pumping mechanism, and a cap. The pumping mechanism includes a body, a drive rod, a plug, and a pressure relief valve. The cap is disposed on the body and the oil storage cylinder, and the cap includes a connector. The drive rod has a press lever, the cap further includes a first air conduit, a first one-way valve assembly, and a second air conduit. The second air conduit has an inlet segment, an outlet opposite to the inlet segment, and a pump segment defined between the inlet segment and the outlet segment and communicating with the oil storage cylinder. The cap further includes a second one-way valve assembly accommodated in the oil storage cylinder and connected with the pump segment, and the second conduit accommodates a pressure reducing valve.

6 Claims, 7 Drawing Sheets

US 11,649,810 B2

OIL SUCTION PUMP

FIELD OF THE INVENTION

The present invention relates to an oil suction pump which is operated manually or pneumatically based on using requirements.

BACKGROUND OF THE INVENTION

Conventional oil suction pump is operated manually or pneumatically to pump oil out of or into a vehicle.

However, the oil suction pump only contains an air conduit, so it is operated manually or pneumatically by ways of an operation shift device disposed on a cap of the oil suction pump, thus having complicated structure and high manufacture cost.

The present invention has arisen to mitigate and/or obviate the afore-described disadvantages.

SUMMARY OF THE INVENTION

The primary aspect of the present invention is to provide an oil suction pump which is operated manually or pneumatically based on using requirements.

To obtain the above mentioned aspect, an oil suction pump provided by the present invention contain: an oil storage cylinder, a pumping mechanism, and a cap.

The pumping mechanism includes a body mounted beside the oil storage cylinder, a drive rod accommodated in the body, a plug fixed on a bottom of the drive rod, and a pressure relief valve secured on a bottom of the body.

The cap is disposed on the body and the oil storage cylinder, and the cap includes a connector configured to connect with an oil tube and communicating with the oil storage cylinder, an end of the drive rod is extended out of the cap, and the drive rod has a press lever connected on a top thereof, the cap further includes a first air conduit communicating with the body and the oil storage cylinder, a first one-way valve assembly connected with the first air conduit and received in the oil storage cylinder, and a second air conduit defined in the cap, wherein the second air conduit has an inlet segment located outside the cap, an outlet opposite to the inlet segment, and an pump segment defined between the inlet segment and the outlet segment and communicating with the oil storage cylinder, the cap further includes a second one-way valve assembly accommodated in the oil storage cylinder and connected with the pump segment, and the second conduit accommodates a pressure reducing valve.

Preferably, the first one-way valve assembly has a first spring and a first valve, and the first spring is mounted in the first air conduit, the first valve is pushed by the first spring to close the first air conduit, wherein the second one-way valve assembly has a second spring and a second valve, and the second spring is fixed in the pump segment, wherein the second valve is pushed by the second spring to close the pump segment.

Preferably, the cap further includes a first air delivery tube connected with an opening of the first air conduit and accommodated in the oil storage cylinder, the first air conduit has multiple first orifice defined on an outer wall thereof, and the first air conduit has a first close element moving upward by ways of a buoyant force so as to close the multiple first orifice; the cap further includes a second air delivery tube connected with the pump segment, wherein the second air delivery tube has multiple second orifices defined on an outer wall thereof, and the first air conduit has a second close element moving upward by ways of the buoyant force so as to close the multiple second orifice.

Preferably, the plug has a first disc, a second disc, and a rubber ring, wherein a gap is defined between the first disc and the body so that air flows in the gap, the second disc has at least one recess configured to flow the air, and the rubber ring is defined between the first disc and the second disc and is pushed by the first disc or the second disc, wherein when the rubber ring is pushed by the first disc, the rubber ring shields the gap between the first disc and the body.

Preferably, the cap further includes a handle arranged on a top thereof.

Preferably, the cap further includes a silencer fixed inside the outlet segment.

DETAILED DESCRIPTION OF THE PREFERRED EMBODIMENTS

Figure 1:
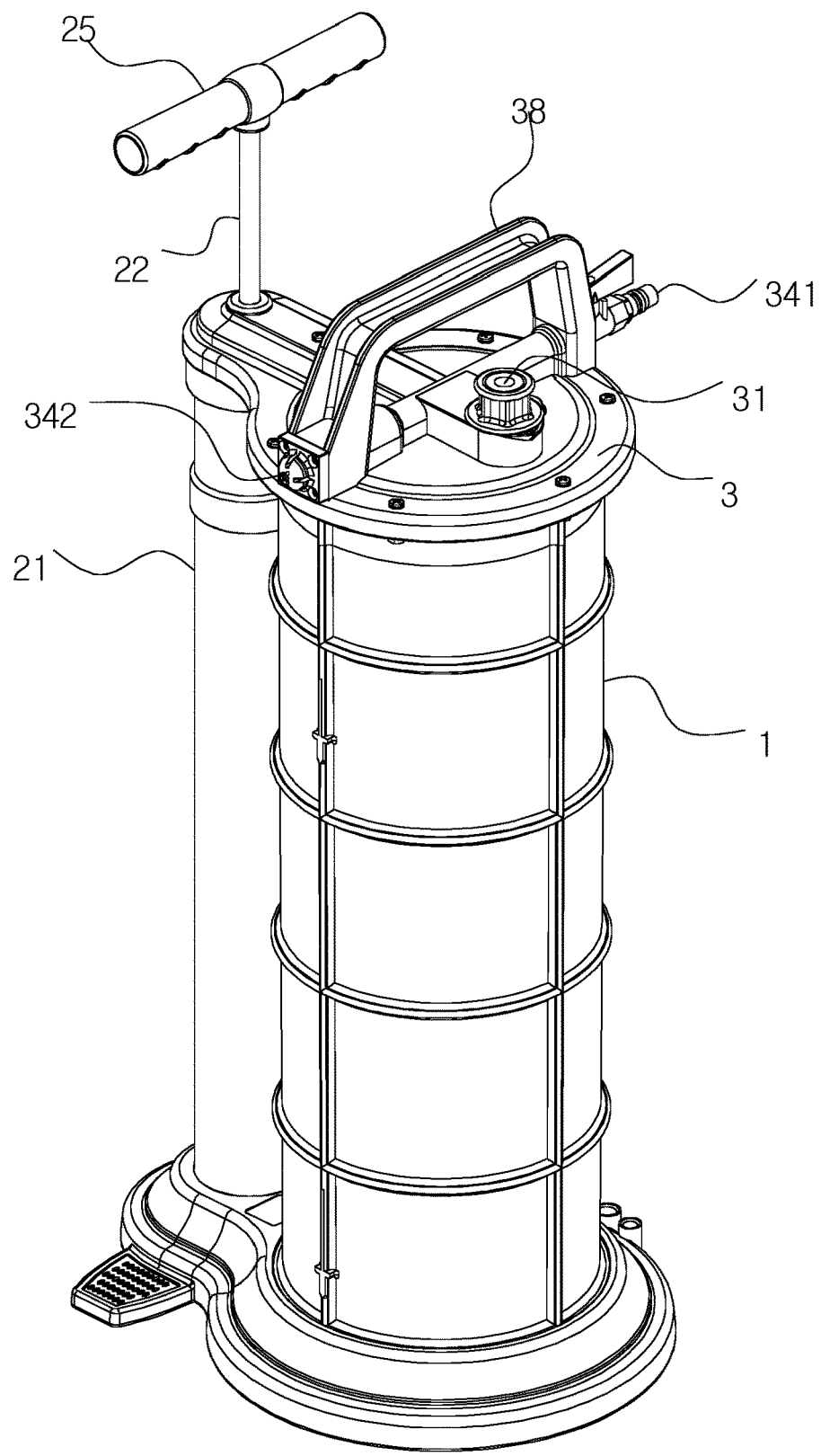
FIG. 1 is a perspective view showing the assembly of an oil suction pump according to a preferred embodiment of the present invention.
Figure 2:
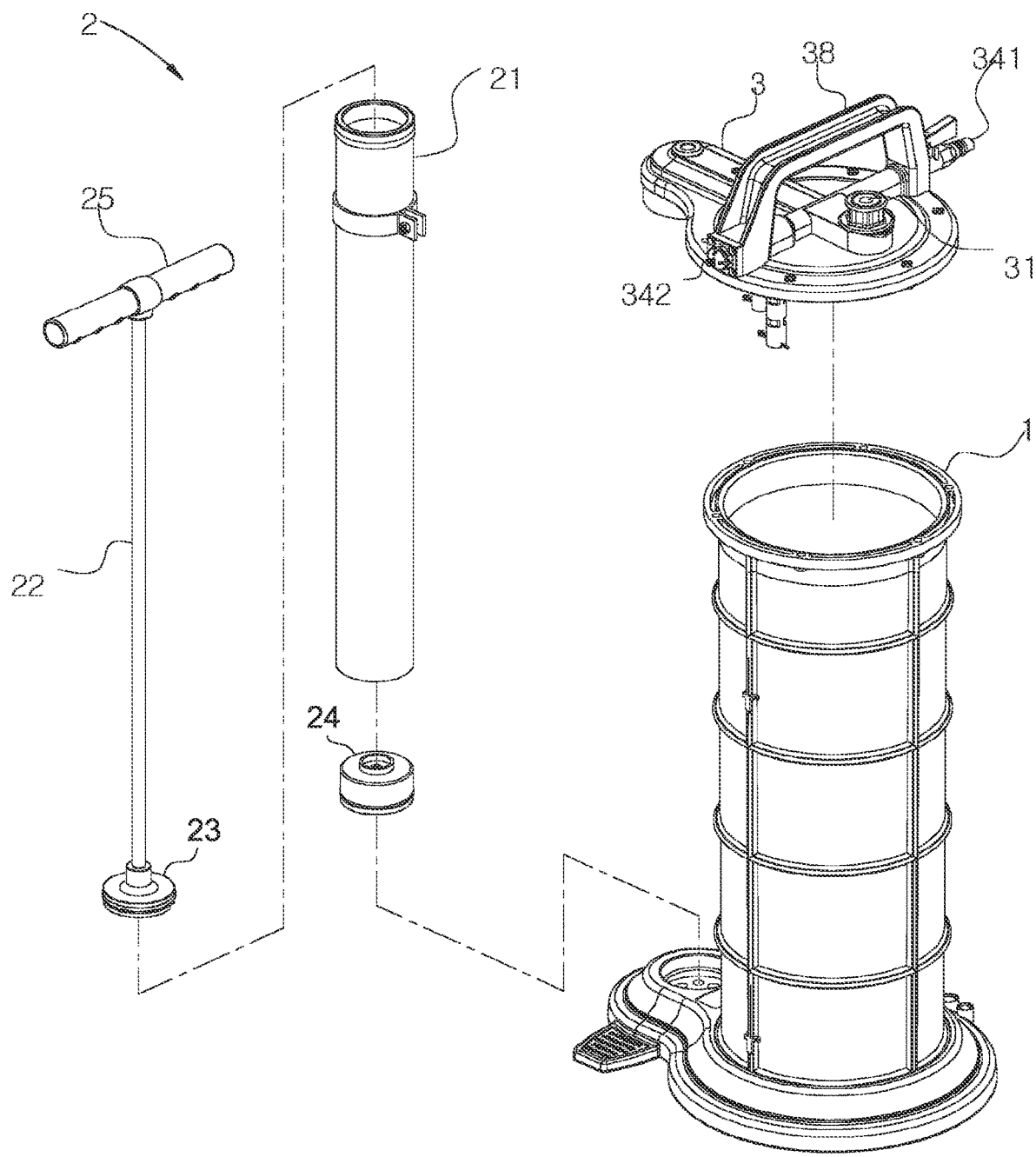
FIG. 2 is a perspective view showing the exploded components of the oil suction pump according to the preferred embodiment of the present invention.
Figure 3:
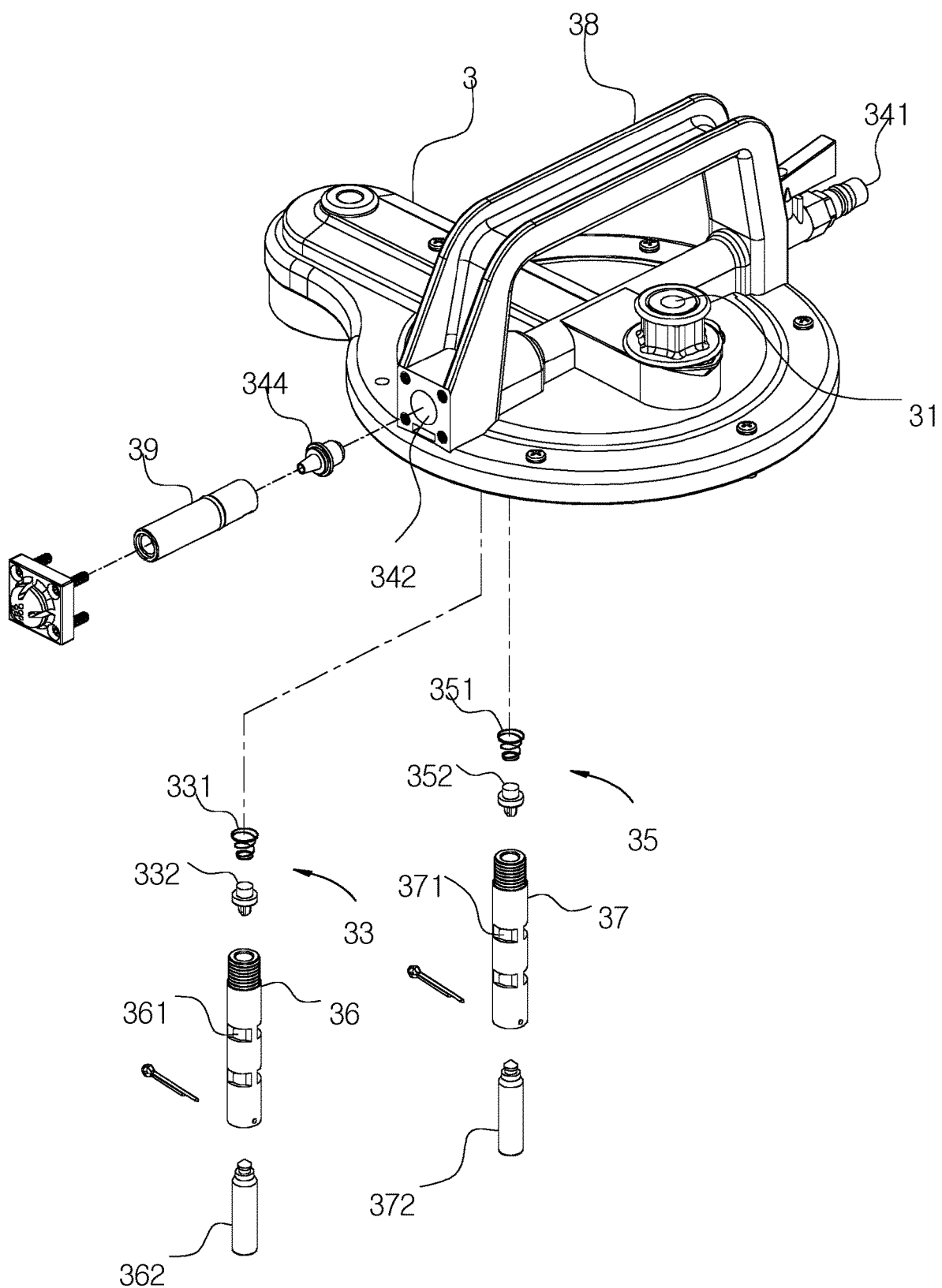
FIG. 3 is a perspective view showing the exploded components of a part of the oil suction pump according to the preferred embodiment of the present invention.

The present invention will be clearer from the following description when viewed together with the accompanying drawings, which show, for purpose of illustrations only, a preferred embodiment in accordance with the present invention.

With reference to FIGS. 1-8, an oil suction pump according to a preferred embodiment of the present invention comprises: an oil storage cylinder 1, a pumping mechanism 2, and a cap 3.

The pumping mechanism 2 includes a body 21 mounted beside the oil storage cylinder 1, a drive rod 22 accommodated in the body 21, a plug 23 fixed on a bottom of the drive rod 22, and a pressure relief valve 24 secured on a bottom of the body 21.

The cap 3 is disposed on the body 21 and the oil storage cylinder 1, and the cap 3 includes a connector 31 configured to connect with an oil tube and communicating with the oil storage cylinder 1. An end of the drive rod 22 is extended out of the cap 3, and the drive rod 22 has a press lever 25 connected on a top thereof. The cap 3 further includes a first air conduit 32 communicating with the body 21 and the oil storage cylinder 1, a first one-way valve assembly 33 connected with the first air conduit 32 and received in the oil storage cylinder 1, and a second air conduit 34 defined in the cap 3, wherein the second air conduit 34 has an inlet segment 341 located outside the cap 3, an outlet 342 opposite to the inlet segment 341, an pump segment 343 defined between the inlet segment 341 and the outlet segment 342 and communicating with the oil storage cylinder 1. The cap 3 further includes a second one-way valve assembly 35 accommodated in the oil storage cylinder 1 and connected with the pump segment 343, and the second conduit 34 accommodates a pressure reducing valve 344.

Figure 4:
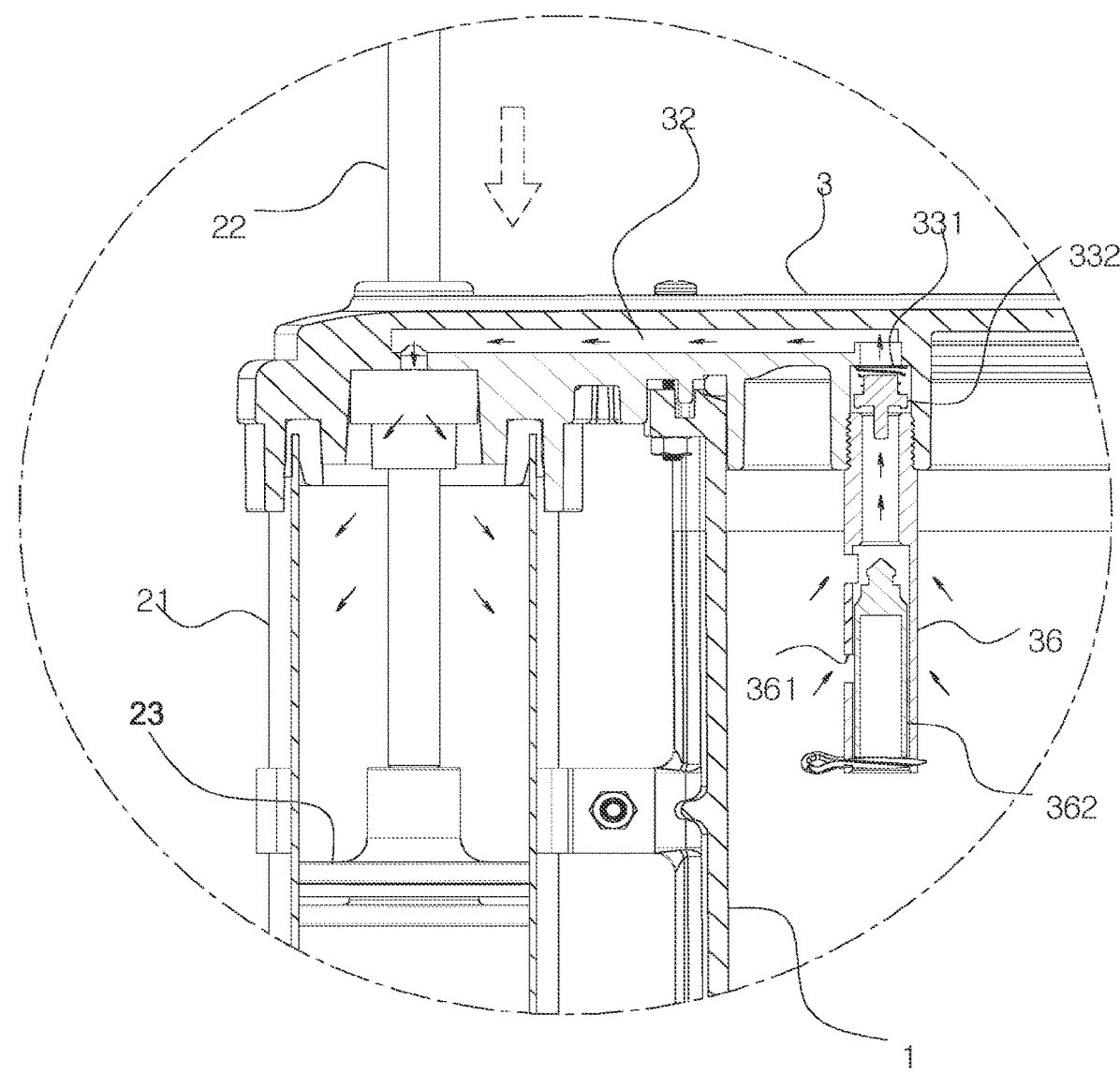
FIG. 4 is a cross sectional view showing the operation of a part of the oil suction pump according to the preferred embodiment of the present invention.

When manually pumping oil by using the pumping mechanism, the connector 31 is connected with the oil tube and an external oil supply source, wherein the press lever 25 is pressed, and the plug 23 is airtight so that air in the oil storage cylinder 1 forces the first one-way valve assembly 33 to open and flows into the body 21. When the air is pumped out of the oil storage cylinder 1 to produce a negative pressure, the oil is pumped into the oil storage cylinder 1 via the connector 31 (as shown in FIG. 4), and the air below the plug 23 is discharged out of the body 21 via the pressure relief valve 24, thus pumping the oil manually. When pulling the press lever 25 upwardly, the pressure relief valve 24 and the first one-way valve assembly 33 are airtight, and the plug 23 is not airtight so that the air above the plug 23 flows downwardly to locate below the plug 23 and discharges out of the oil storage cylinder 1.

Figure 5:
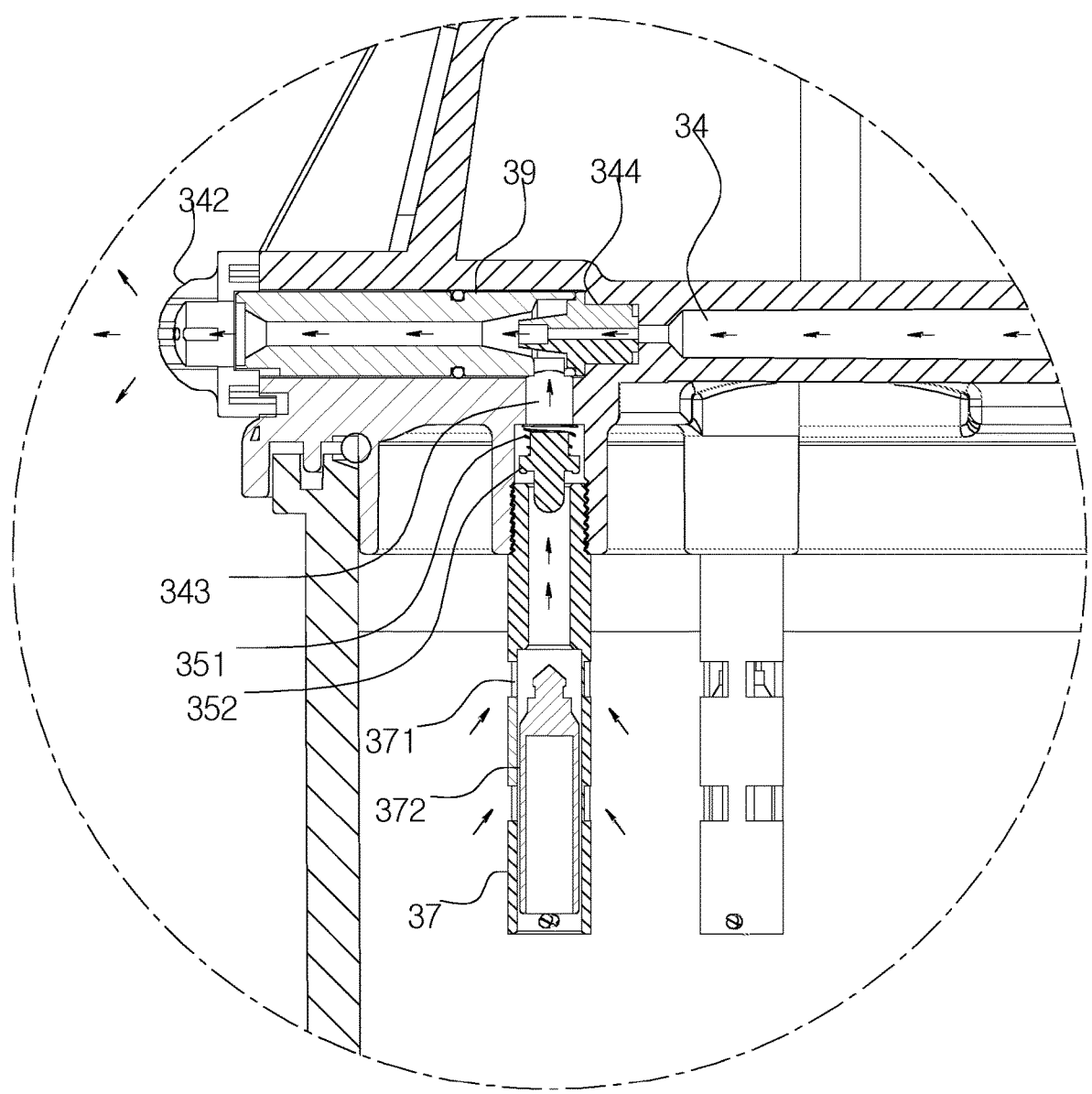
FIG. 5 is another cross sectional view showing the operation of a part of the oil suction pump according to the preferred embodiment of the present invention.

When pneumatically pumping the oil, the inlet segment 341 is connected with an air compressor (not shown), and the oil suction pump is turned on so that the air flows into the second conduit 34. When the air flows through the pressure reducing valve 344 at a slow speed, the negative pressure produces so that the air in the oil storage cylinder 1 forces the second one-way valve assembly 35 to open and discharges out of the oil storage cylinder 1 via the outlet segment 342. When the air is pumped out of the oil storage cylinder 1 to produce the negative pressure, the oil is pumped into the oil storage cylinder 1 via the connector 31 (as shown in FIG. 5), thus pumping the oil pneumatically.

The first one-way valve assembly 33 has a first spring 331 and a first valve 332, wherein the first spring 331 is mounted in the first air conduit 32, the first valve 332 is pushed by the first spring 331 to close the first air conduit 32. The second one-way valve assembly 35 has a second spring 351 and a second valve 352, wherein the second spring 35 is fixed in the pump segment 343, wherein the second valve 352 is pushed by the second spring 351 to close the pump segment 343, such that when the first valve 332 is forced by the negative pressure to urge the first spring to open the first air conduit 32, the second valve 352 is forced by the negative pressure to close the pump segment 343 tightly. When the second valve 352 is forced by the negative pressure to urge the second spring 351 to open the pump segment 343, the first valve 332 is forced by the negative pressure to close the first air conduit 32 tightly, thus avoiding an air leakage.

Figure 8:
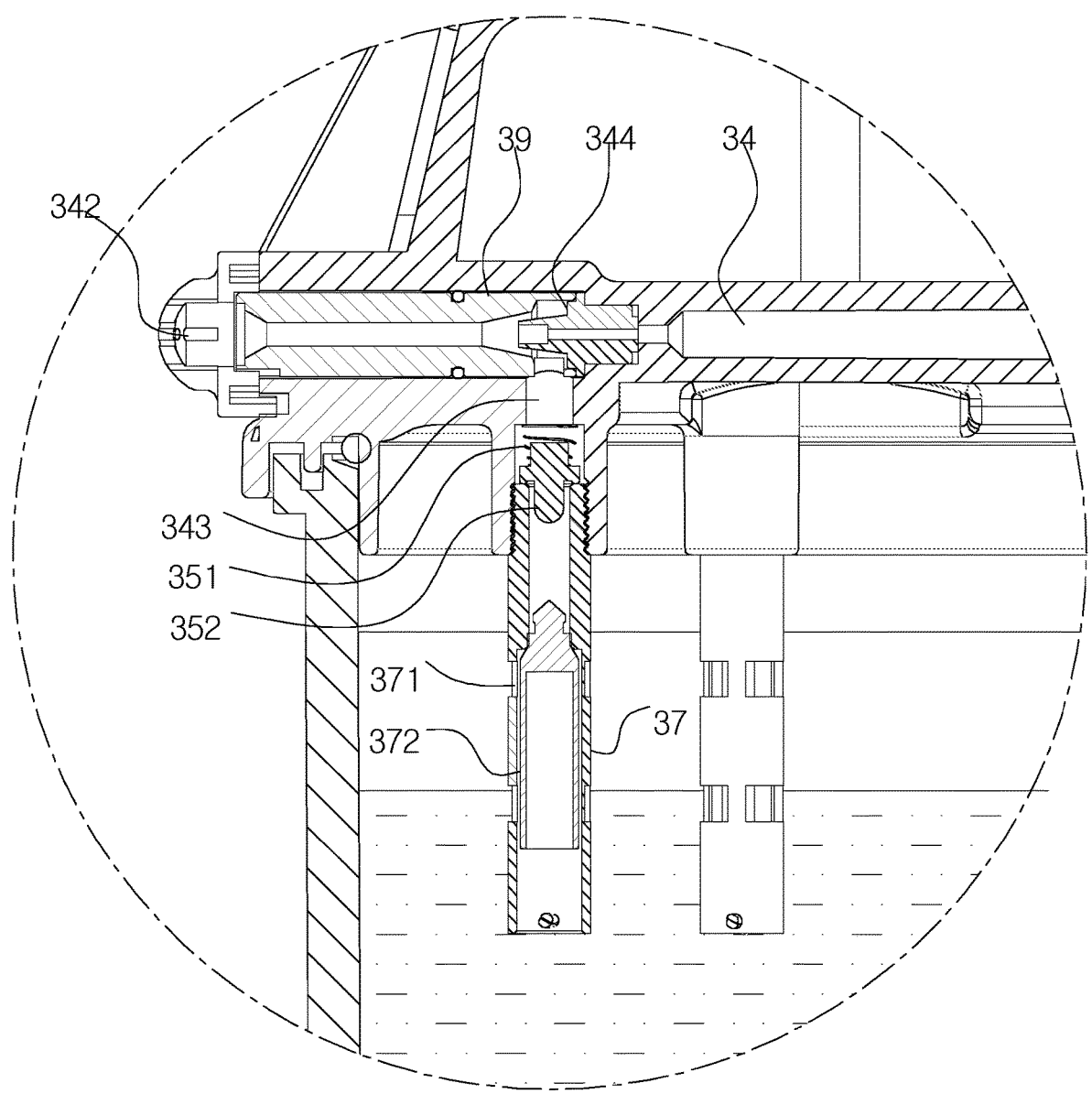
FIG. 8 is another cross sectional view showing the operation of a part of the oil suction pump according to the preferred embodiment of the present invention.

The cap 3 further includes a first air delivery tube 36 connected with an opening of the first air conduit 32 and accommodated in the oil storage cylinder 1, wherein the first air conduit 36 has multiple first orifice 361 defined on an outer wall thereof, and the first air conduit 36 has a first close element 362 moving upward by ways of a buoyant force so as to close the multiple first orifice 361. The cap 3 further includes a second air delivery tube 37 connected with the pump segment 343, wherein the second air delivery tube 37 has multiple second orifices 371 defined on an outer wall thereof, and the first air conduit 37 has a second close element 372 moving upward by ways of the buoyant force so as to close the multiple second orifice 371. When the oil lifts upward to a predetermined level in the oil storage cylinder 1, the first close element 362 and the second close element 372 are airtight to close the multiple first orifices 361 and the multiple second orifices 371. Referring to FIG. 8, when the oil suction pump is operated manually or pneumatically, the air is not pumped out of the oil storage cylinder 1, thus stopping pumping the oil out of the oil storage cylinder 1.

Figure 6:
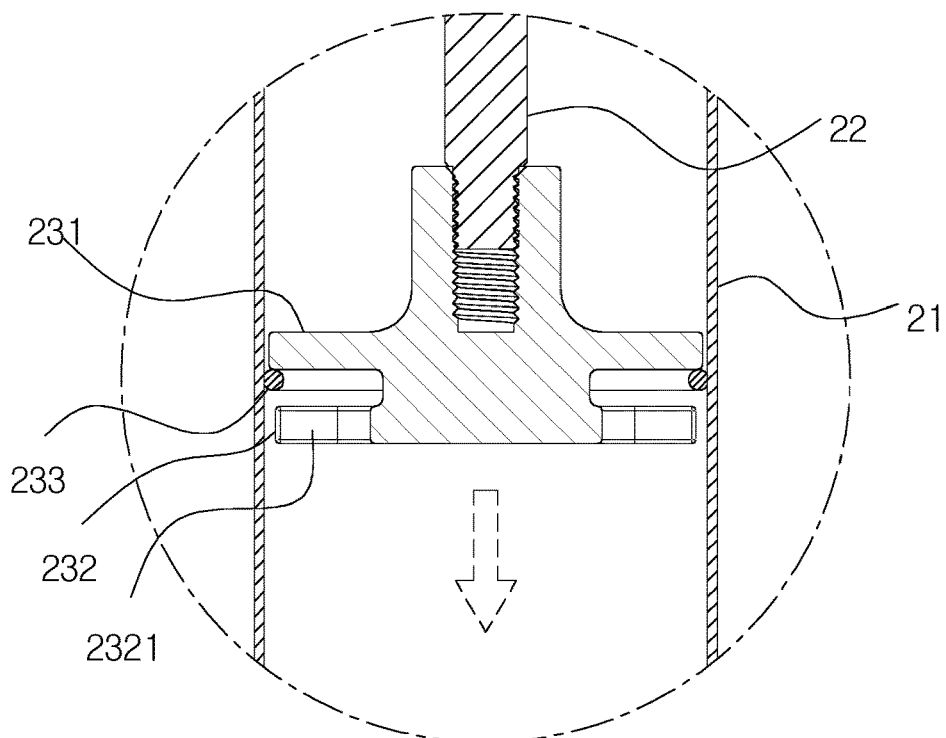
FIG. 6 is also another cross sectional view showing the operation of a part of the oil suction pump according to the preferred embodiment of the present invention.
Figure 7:
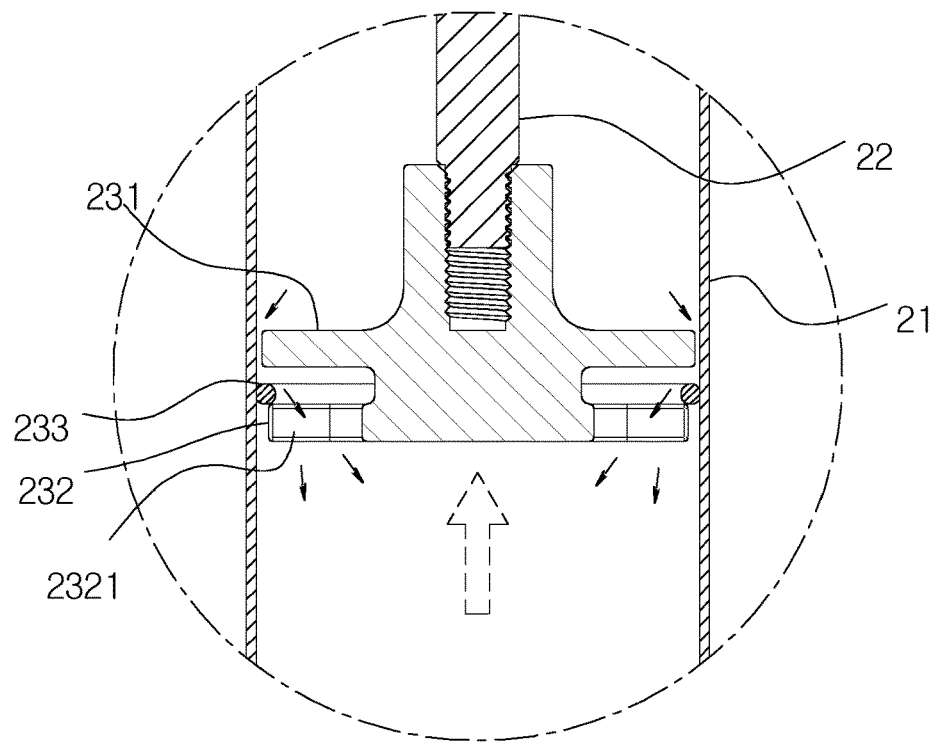
FIG. 7 is still another cross sectional view showing the operation of a part of the oil suction pump according to the preferred embodiment of the present invention.

As illustrated in FIGS. 6 and 7, the plug 23 has a first disc 231, a second disc 232, and a rubber ring 233, wherein a gap is defined between the first disc 231 and the body 21 so that the air flows in the gap, the second disc 232 has at least one recess 2321 configured to flow the air, and the rubber ring 233 is defined between the first disc 231 and the second disc 232 and is pushed by the first disc 231 or the second disc 232, wherein when the rubber ring 233 is pushed by the first disc 231, it shields the gap between the first disc 231 and the body 21, such that when the plug 23 is pressed to push the rubber ring 233 by using the first disc 231, an airtight space forms above the plug 23 in the body 21 to pump the air into the airtight space from the oil storage cylinder 1. When the plug 23 moves upward to push the rubber ring 233 by ways of the second disc 232, an airtight effect in the airtight space is released so that the air flows to the bottom of the plug 23 from the top of the plug 23 via the at least one recess 2321.

The cap 3 further includes a handle 38 arranged on a top thereof.

The cap 3 further includes a silencer 39 fixed inside the outlet segment 342.

Thereby, the oil suction pump of the present invention is operated manually or pneumatically based on using requirements.

While various embodiments in accordance with the present invention have been shown and described, it is clear to those skilled in the art that further embodiments may be made without departing from the scope of the present invention.

What is claimed is:

1. An oil suction pump comprising: an oil storage cylinder, a pumping mechanism, and a cap;
wherein the pumping mechanism includes a body mounted beside the oil storage cylinder, a drive rod accommodated in the body, a plug fixed on a bottom of the drive rod, and a pressure relief valve secured on a bottom of the body;
wherein the cap is disposed on the body and the oil storage cylinder, and the cap includes a connector configured to connect with an oil tube and communicating with the oil storage cylinder, an end of the drive rod is extended out of the cap, and the drive rod has a press lever connected on a top thereof, the cap further includes a first air conduit communicating with the body and the oil storage cylinder, a first one-way valve assembly connected with the first air conduit and received in the oil storage cylinder, and a second air conduit defined in the cap, wherein the second air conduit has an inlet segment located outside the cap, an outlet segment opposite to the inlet segment, and an pump segment defined between the inlet segment and the outlet segment and communicating with the oil storage cylinder, the cap further includes a second one-way valve assembly accommodated in the oil storage cylinder and connected with the pump segment, and the second air conduit accommodates a pressure reducing valve.

2. The oil suction pump as claimed in claim 1, wherein the first one-way valve assembly has a first spring and a first valve, and the first spring is mounted in the first air conduit, the first valve is pushed by the first spring to close the first air conduit, wherein the second one-way valve assembly has a second spring and a second valve, and the second spring is fixed in the pump segment, wherein the second valve is pushed by the second spring to close the pump segment.

3. The oil suction pump as claimed in claim 2, wherein the cap further includes a first air delivery tube connected with an opening of the first air conduit and accommodated in the oil storage cylinder, the first air conduit has multiple first orifices defined on an outer wall thereof, and the first air conduit has a first close element moving upward by ways of a buoyant force so as to close the multiple first orifices; the cap further includes a second air delivery tube connected with the pump segment, wherein the second air delivery tube has multiple second orifices defined on an outer wall thereof, and the first air conduit has a second close element moving upward by ways of the buoyant force so as to close the multiple second orifices.

4. The oil suction pump as claimed in claim 1, wherein the plug has a first disc, a second disc, and a rubber ring, wherein a gap is defined between the first disc and the body so that air flows in the gap, the second disc has at least one recess configured to flow the air, and the rubber ring is defined between the first disc and the second disc and is pushed by the first disc or the second disc, wherein when the rubber ring is pushed by the first disc, the rubber ring shields the gap between the first disc and the body.

5. The oil suction pump as claimed in claim 1, wherein the cap further includes a handle arranged on a top thereof.

6. The oil suction pump as claimed in claim 1, wherein the cap further includes a silencer fixed inside the outlet segment.

\* \* \* \* \*